US008147628B2

(12) United States Patent
Lo et al.

(10) Patent No.: US 8,147,628 B2
(45) Date of Patent: Apr. 3, 2012

(54) METHOD FOR PRODUCING CRYOGENIC, SOLID MONOPROPELLANTS AND SOLID PROPELLANTS PRODUCED ACCORDING TO SAID METHOD

(76) Inventors: Roger E. Lo, Berlin (DE); Harry Adirim, Berlin (DE)

( * ) Notice: Subject to any disclaimer, the term of this patent is extended or adjusted under 35 U.S.C. 154(b) by 978 days.

(21) Appl. No.: 10/511,865

(22) PCT Filed: Apr. 14, 2003

(86) PCT No.: PCT/EP03/03860
§ 371 (c)(1),
(2), (4) Date: Mar. 10, 2005

(87) PCT Pub. No.: WO03/087017
PCT Pub. Date: Oct. 23, 2003

(65) Prior Publication Data
US 2005/0189051 A1 Sep. 1, 2005

(30) Foreign Application Priority Data

Apr. 16, 2002 (EP) .................................... 02090144

(51) Int. Cl.
*C06B 47/00* (2006.01)
*C06B 45/00* (2006.01)
*C06B 45/10* (2006.01)
*D03D 23/00* (2006.01)
*D03D 43/00* (2006.01)

(52) U.S. Cl. .......... 149/19.92; 149/1; 149/2; 149/109.2; 149/109.6

(58) Field of Classification Search ................. 149/1, 2, 149/19.92, 109.2, 109.6
See application file for complete search history.

(56) References Cited

U.S. PATENT DOCUMENTS 3,137,127 A * 6/1964 Grosse et al. ................... 60/219
3,143,446 A   8/1964 Berman
(Continued)

FOREIGN PATENT DOCUMENTS
EP         1 354 862        10/2003

*Primary Examiner* — James McDonough
(74) *Attorney, Agent, or Firm* — Jonathan Myers; Andrew Wilford

(57) ABSTRACT

The invention relates to a method for producing (cryogenic) solid monopropellants which are cooled to below room temperature and are used for rocket drives, especially using heterogeneous liquid-solid propellants wherein at least one of the reactants in the form of an oxidizer or a fuel contains a phase which is liquid or gaseous at normal temperature, for example emulsions of liquid constituents which do not dissolve in each other, suspensions of solid in liquid constituents or liquid-impregnated feed materials. The invention also relates to a cryogenic solid propellant for rocket drives, especially heterogeneous quasi-monopropellant fuel-oxidizer combinations. The aim of the invention is to increase the efficiency of the cryogenic solid propellants compared with conventional storable solid drives, hybrid drives or liquid driving gears, and to improve in a simple manner the storage properties and economic efficiency of said propellants, avoiding costly liquid management, and simultaneously eliminating the permanent ignition of the cryogenic solid propellants. To this end, the at least one liquid or gaseous phase embodied as a reactant in the form of a fuel or an oxidizer is transferred into a solid structure comprising interconnected cavities, said structure consisting of reactants which are formed in such a way that they complement the liquid phase, and the liquid phase is converted into a cryogenic solid phase inside the solid structure by means of freezing, said solid phase being stable below normal temperature.

22 Claims, 3 Drawing Sheets

U.S. PATENT DOCUMENTS

| | | |
|---|---|---|
| 3,191,535 A | 6/1965 | Mulloy |
| 3,204,560 A | 9/1965 | Gustavson |
| 3,259,532 A * | 7/1966 | Reynolds .......................... 149/1 |
| 3,367,268 A | 2/1968 | Spenadel |
| 3,687,746 A | 8/1972 | Bieber |
| 3,691,769 A * | 9/1972 | Keilbach et al. ................ 60/217 |
| 5,529,648 A * | 6/1996 | Stickler ........................ 149/19.1 |
| 5,834,539 A * | 11/1998 | Krivohlavek ................... 524/60 |
| 6,101,808 A | 8/2000 | Knuth |

\* cited by examiner

METHOD FOR PRODUCING CRYOGENIC, SOLID MONOPROPELLANTS AND SOLID PROPELLANTS PRODUCED ACCORDING TO SAID METHOD

The invention relates to a method of producing monergole solid propellants [solid monopropellants] cooled below room temperature (cryogens) especially from heterogeneous liquid/solid propellants in which at least one of the reactants as oxidizer or fuel contains a phase which is liquid or gas at standard [normal] temperature, for example an emulsion of mutually insoluble liquid components, suspensions of solids in liquid components or liquid/impregnated bulk material.

The invention relates further to a solid propellant cooled below room temperature [cryogenic solid propellant] for rocket drives, especially a heterogeneous quasimonergole [monopropellant] propellant-oxidizer combination in which at least one of the reactants is a liquid or gas phase at standard temperature, for example, an emulsion of liquid components which are not mutually soluble, a suspension of a solid component in a liquid component, or a liquid impregnated bulk material.

The invention is thus in the technological field of propellants for rocket drives and their fabrication and the development of solid propellant combinations. As such, it should be understood that within the framework of the invention are specific geometric forms of simple propellant blocks and assemblies thereof. This encompasses as well possible inclusions such as baffles and the like which can be incorporated in the block and which in uncooled propellants capable of storage are included for mechanical reasons as seals, combustion inhibitors, as melt loss inhibitors or for other reasons and in the case of cryogenic solid propellants serve for or as support, filling, emptying or cooling devices. In both cases, during combustion or firing, in operation they may be completely or partly burned up.

With all known rocket fuels, the components are in a liquid and/or solid aggregation state and serve as oxidizers or as fuel. Many have still other functions and can act for example as binders or additives.

Independently of the state of aggregation, propellant substances whether having oxidizer or fuel functions can be considered as individual or monergole substances (single component fuel substance). By separating the functions for different components, one can have diergoles. Monergoles can, dependent on their phase structure and their molecular composition a homogeneous or heterogeneous aggregation state. Examples of homogenous monergoles as liquid propellants are hydrogen peroxide, hydrazine and nitroglycerin. Heterogeneous monergoles encompass for example emulsions of liquid components which are not mutually soluble.

An entire series of preparations for rocket drives are known which have at least one of the components in a liquid phase at standard temperature (U.S. Pat. No. 2,802,332, U.S. Pat. No. 3,367,268, U.S. Pat. No. 3,398,215, U.S. Pat. No. 3,687,746, U.S. Pat. No. 3,697,455, U.S. Pat. No. 3,703,080).

U.S. Pat. No. 2,802,332 describes a propellant system for a liquid rocket which has a structure formed by a multiplicity of cells. Each of these cells contains at least one reactant. The walls of the cell-like structure are comprised of polyethylene, Teflon or silicone rubber. The individual cells are connected with one another by openings.

The state of the art of U.S. Pat. No. 3,367,268 deals with a hybrid rocket propellant system which is formed by a solid polymeric cell-like rubber substance which forms an intercellular matrix. In this matrix pulverulent fuel, for example, a light metal powder from groups II and III of the periodic system of the elements and reinforcing fibers are embedded. The pores contain a liquid oxidizer.

In U.S. Pat. No. 3,398,215 a method of making a rocket propellant system is described in which a hardenable rubber polymer is mixed with pulverulent metal fuel and a hardener and is treated as an organic preparation. The rubber polymer is selected from the group of rubber-like hydrocarbons and the halogenated hydrocarbon rubbers. As the metal fuel, powders of aluminum, boron, titanium, beryllium, magnesium and lithium are used. The organic preparation boils at 70 to 200° C. and is compatible with the polymer. It is evaporated at the hardening temperature of 120° C. to 205° C. in the composite to form pores or cells therein. The foam-like matrix contains the metal fuel and forms a phase which holds together. The matrix is then immersed in an oxidizer liquid so that the pores are filled with the oxidizer liquid. All of these known solutions have the common drawback that they are able to achieve only a very low power level and are complicated in their construction and handling.

It is also known to fabricate propellant systems in very different geometric forms. They can however be divided coarsely into two categories, namely, internal burners with a plurality of radially-directed burn-up segments and end burners with a plurality of axially directed burn-up segments.

Apart from monergole propellants [monopropellants] there are known propellants which contain the fuel and oxidizer as separate elements in various geometric arrangements. Examples are radially burning disk stacks or rod-in-matrix end burners (R. E. LO, N. EISENRIECH; "Modulare und kryogene Feststofftreibsätze—eine neue Klasse chemischer Raketenantriebe", Deutscher Luft—und Raumfahrtkongress, DGLR-JT98-104; Bremen, Jul. 10, 1998; Jahrbuch 1998, Band 2, S. 1231) (Modular and cryogenic solid propellant systems—a new class of chemical rocket drives). Such arrangements are designated as modular drive systems. Modular drive systems with which modular elements are in the diergole [two component preparants] classification. The burn involves a diffusion frame with so-called boundary layer burns which is not followed or not easily followed by a transition to an end controlled explosion or destination. One should also distinguish encapsulated components propellants from modular propellants. The goal of encapsulation is the mutual separation of reactive liquids and thereby the improvement in the long-term storage capabilities. Liquids or very sensitive reactants can be included in the capsules. No capsules are incorporated in an undirected manner in binders. Minor propellants are oriented and cast in place with a binder or hardenable solid propellant. With increasing capsule size (see R. M. McCURDY et al "Solid Propellant Grain Containing Metal Macrocapsules of Fuel and Oxidizer", U.S. Pat. No. 3,527,168) and an oriented arrangement, encapsulated propellants move into the subclass of rod-in-matrix preparations.

With smaller element dimensions and especially when the elements become no longer uniform but rather are statistically arranged, one obtains with all known propellants a transition to the heterogeneous monergole class. The preparation combinations which are thus formed can best be described as "quasimonergoles".

The same relatively poor boundaries between monergoles and diergoles can be found in the case of filled foam propellants and propellant bulk materials which are incorporated in a cast matrix. These two classes of propellant have in common modular propellant systems that they are hardly interesting for practical use in rocket drives because of the storage characteristics although the reasons differ. In the case of modular solid propellants the choice of storable propellants is limited because of energy availability grounds. Where there is a greater selection in the case of liquid propellants, these are limited because of the solid phases used in solid/liquid heterogeneous bulk materials and foam. The characteristic limitations derive from their limited suitability under propellant operating conditions where separation of the liquid phase must be avoided absolutely. While encapsulation is a possible solution, it is burdened by the complex fabrication conditions. When the capsules grow to the size of bars as in the case of modular rod-in-matrix propellant systems, the methods for composites of liquids become no longer suitable.

Apart from the storable solid propellant systems, propellants which have been frozen have been proposed. These can have components which are liquids or gases at standard temperature. Such propellants are here designated as cryosolid propellants (cryogenic solid propellants or CSP).

Monergole CSP are comprised of frozen monergoles which are liquid at room temperature. Modular CSPs are assembled from at least frozen elements which cannot be burned alone (U.S. Pat. No. 3,137,127). The burning of modular nonmonomergole propellant elements are basically a diffuse boundary layer burn and as such, dependent upon the flow of reactants. This flow is not effected as a force flow but only proceeds by convection, the reaction is not controllable and drags whenever it predominates. As a result modular drive systems at least from a certain size of the element, require one or more ignition discharge generators (U.S. Pat. No. 6,311,479).

In this state of the art the invention has as its object to increase the power availability of cryosolid propellants by comparison with conventional solid propellants, hybrid propellants or liquid propellants, to improve the storability and economy of a rocket propellant while avoiding expensive liquid management and eliminating simultaneously the need for permanent ignition of cryosolid propellants in a simple way.

This object is attained with the method of the type set out at the outset with the characterizing method to prepare a solid propellant and the solid propellant per se.

Advantageous refinements can be deduced from the dependent claims. The method according to the invention is characterized above all in that by the freezing of the liquid phase in a heterogeneous liquid-solid propellant, so that the latter can be converted to a cryogenic monergole solid propellant whereby the permanent ignition can be dropped and problems of liquid management which may arise with normal liquid-solid quasimonergoles can be overcome.

The invention covers therefore all quasimonergole fuel-oxidizer combinations in which at least one of the components is a frozen liquid. The invention yields a significant power increase for carrier rockets. Apart from the environmental compatibility of the drive, the invention enables a choice of suitable propellant candidates like for example SOX or $SH_2O_2$ in combination with solid hydrocarbons like PE, PU, HTPB to significant operating and this starting cost saving pairings. In spite of apparent but not relevant technological problems of cryogenic solid rockets, the invention enables for them a potentially greater market in rocket technology.

Further advantages and details are given in the following description with reference to the accompanying drawing.

The invention will be described in greater detail with a specific example.

The drawing shows:

FIG. 1 a section through a polymer foam as a solid structure with a cryogenic phase incorporated therein, FIG. 2 a section through an aluminum foam as a solid structure with an incorporated cryogenic phase and FIG. 3 a section through a cast packing of polyethylene and cryogenic phase.

The rocket drive system of a solid propellant according to the invention should be made by the method of the invention.

The solid propellant should, as FIG. 1 shows, be comprised of a polymer foam 1, for example of polyethylene as a fuel and a cryogenic oxidizer phase 2, for example frozen hydrogen peroxide. The foam 1 as a solid phase is initially affixed to the internal insulation of a fuel chamber wall which has not been shown and then has its capillaries filled with hydrogen peroxide utilizing capillary forces or a pressure gradient and then frozen in the foam 1 as required by undercooling. The hydrogen peroxide remains as a cryogenic phase in the foam 1.

Naturally it is also possible without departing from the invention to foam the foam 1 directly in the combustion chamber.

The combustion of the solid propellant according to the invention is then effected analogously to the classical solid fuel combustion in the combustion chamber whereby the propellant is ignited by means of an igniter.

Figure 1:
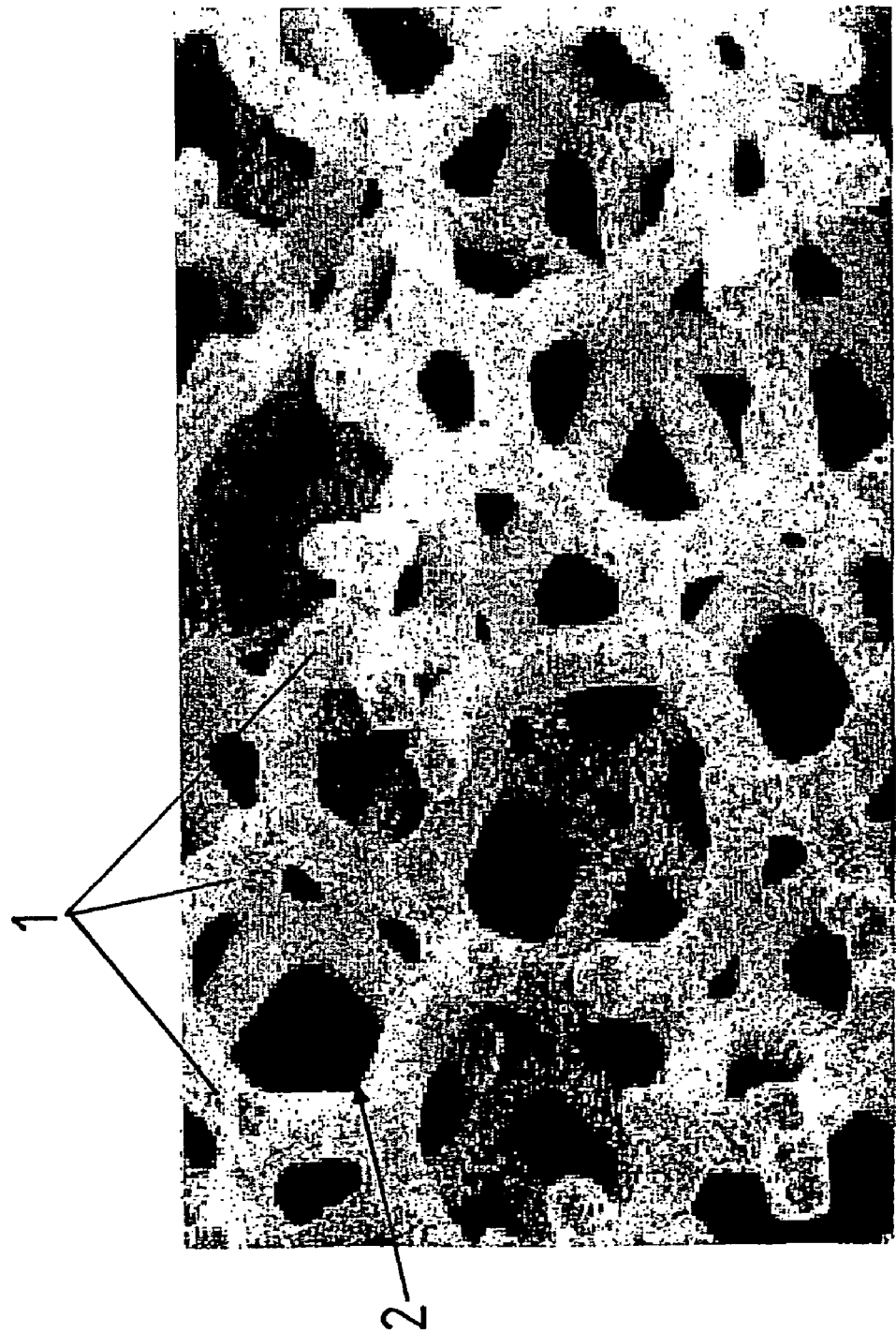
Figure 2:
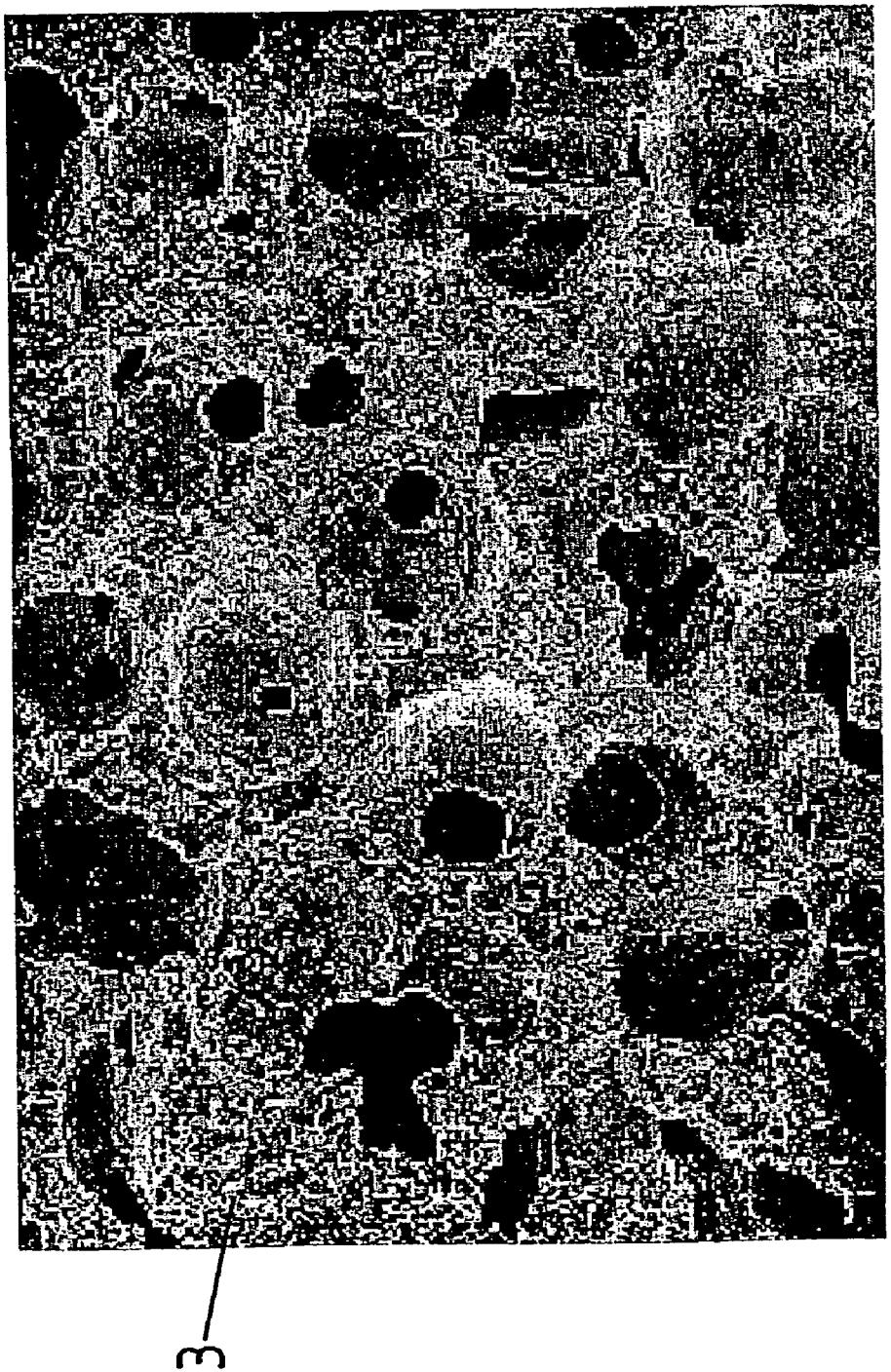
FIG. 2 shows an example in which an aluminum foam 3 is used as the solid phase and has its pores filled with frozen oxygen. The production of the solid propellant according to the invention is effected as has been described previously.
Figure 3:
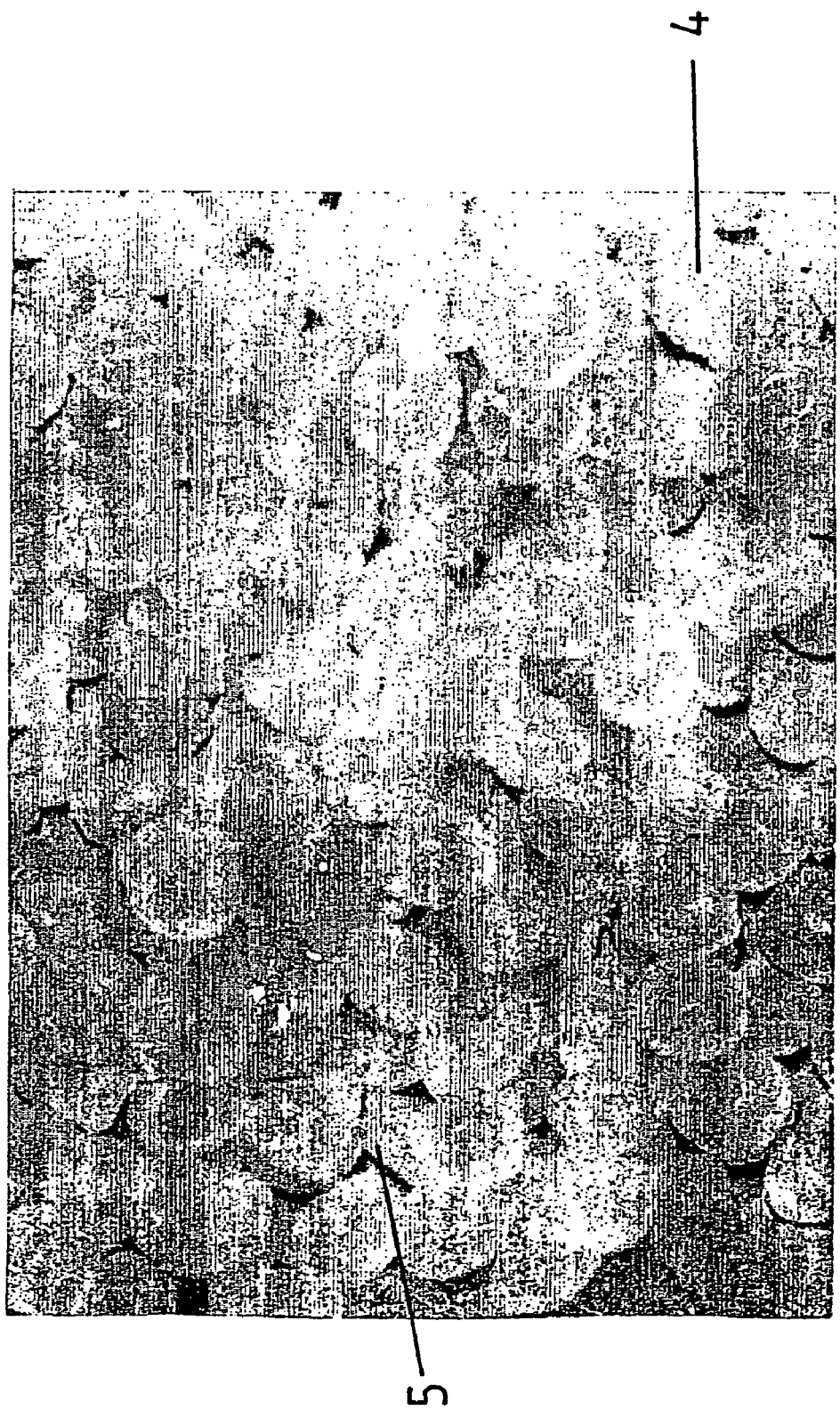
FIG. 3 shows a polyethylene packing 4 whose interior is filled with an oxidizer 5 which is liquid at room temperature and after filling has been frozen.

The following table shows the range of applications of the present invention in which two components are provided in each case and whereby the oxidizer formed by one component of the fuel formed by the other component are each replaceable by others. Each component can then be a homogeneous or heterogeneous mixture of different substances.

Note should be taken especially that naturally also high energy materials, for example representatives of high energy density matter (HEDM) as components or additives can be considered, especially dispersed atoms or molecules in a stabilizing matrix, stressed compounds (for example CUBAN), weakly covalent components (polynitrogen compounds), excited atoms or activated atoms or molecules (triplet helium) or metallic hydrogen. The cryogenic temperature provides a stabilization of the HEDM and is absolutely relevant to its use.

The different possibilities of the topologies of the components are not considered here, that is in the following table, it is not critical whether foams or bulk material or packings are used or whether or not these are mentioned as examples. Materials are described as "storable" when they have the given state of aggregation at room temperature and as "cryogens" when they require cooling as a rule on one of the above-mentioned grounds.

It suffices to observe that in solid rocket propellant systems all components will have the same starting point temperature regardless of their nature.

TABLE

MORPHOLOGY OF CRYOGENIC QUASI-MONERGOLES

| COMPONENT 1 | COMPONENT 2 | EXAMPLES |
|---|---|---|
| Storable solid | Cryogenic solid | Plastic foam impregnated with frozen hydrogen peroxide ($SH_2O_2$) or oxygen (SOX) with |

TABLE-continued

MORPHOLOGY OF CRYOGENIC QUASI-MONERGOLES

| COMPONENT 1 | COMPONENT 2 | EXAMPLES |
|---|---|---|
| Storable solid | Cryogenic liquid | fuel particles of plastic or metal embedded therein Capsules or tubes of cryogenic components in solid |
| Cryogenic solid | Cryogenic solid | Frozen oxygen with frozen fuel in any possible quasi-monergole composition, for example SMOX (solid methane and solid oxygen) |
| Cryogenic solid | Storable liquid | Frozen $H_2O_2$ with liquid fuel encapsulated therein |
| Cryogenic solid | Cryogenic liquid | Combinations of frozen hydrocarbons with liquid oxygen encapsulated therein |
| Cryogenic liquid | Cryogenic or storable liquid | Bulk material (packing) of capsules of both components bonded together with an additional binder |

The invention claimed is:

1. A method of making a cryogenic solid monergole propellant out of a heterogeneous liquid-solid propellant, from reactants at least one of which is a fuel and an oxidizer which contains a phase that is liquid or gaseous at standard temperature, which comprises the steps of:
    (a) incorporating at least one liquid or gaseous phase reactant in the form of an oxidizer in a solid phase structure, open pore plastic foam fuel, having hollow spaces which are connected to each other; and
    (b) transforming the liquid or gaseous phase oxidizer incorporated in the solid phase structure, open pore plastic foam fuel, having hollow spaces connected to each other by freezing the liquid or gaseous phase into a stable cryogenic solid phase below standard temperature within the hollow spaces of the solid phase structure, open pore plastic foam fuel, inside a combustion chamber to obtain a rocket propellant with improved storability while avoiding the need for liquid management and simultaneously eliminating need for permanent ignition thereof.

2. The method of making a cryogenic solid monergole propellant defined in claim 1 wherein the at least one liquid or gaseous phase reactant is an emulsion of liquid components which are not soluble in one another.

3. The method of making a cryogenic solid monergole propellant defined in claim 1 wherein the at least one liquid or gaseous phase reactant is a suspension of solid components in liquid components or liquid impregnated bulk materials or packings.

4. The method of making a cryogenic solid monergole propellant defined in claim 1 wherein the open pore plastic foam fuel is a polyethylene foam, a polyurethane foam, a HTBP foam, or a GAP foam.

5. The method of making a cryogenic solid monergole propellant defined in claim 1 wherein the solid phase structure, open pore plastic foam fuel, having hollow spaces is a packing incorporated in a casting material and composed of polyethylene, polyurethane, HTPB, or GAP.

6. The method of making a cryogenic solid monergole propellant defined in claim 1 wherein according to step (a) the liquid phase is incorporated in the solid phase structure by immersion and/or impregnation thereof.

7. The method of making a cryogenic solid monergole propellant defined in claim 1 wherein according to step (a) the liquid or gas phase reactant is oxygen, a hydrocarbon, hydrogen peroxide or an HEDM propellant.

8. The method of making a cryogenic solid monergole propellant defined in claim 1 wherein according to step (b) the solid monergole propellant is produced by freezing liquid oxidizer.

9. The method of making a cryogenic solid monergole propellant defined in claim 8 wherein the liquid oxidizer is oxygen, a hydrocarbon, hydrogen peroxide or an HEDM propellant.

10. The method of making a cryogenic solid monergole propellant defined in claim 1 wherein according to step (a) the liquid phase is initially encapsulated, then mixed with the solid phase structure and bonded with the binder.

11. The method of making a cryogenic solid monergole propellant defined in claim 1 wherein according to steps (a) and (b) the liquid phase is encapsulated and before freezing the liquid phase, the solid phase structure is mixed therewith, and both phases are frozen together.

12. The method of making a cryogenic solid monergole propellant defined in claim 1 wherein according to step (a) combustion speed of the cryogenic solid monopropellant system is adjusted by selecting a special hollow space size in the solid phase structure.

13. A stabilized cryogenic solid monergole propellant for a rocket motor combustion chamber equipped with an inner isolation which comprises a solid or heterogeneous quasi-monergolic fuel oxidizer combination cooled to below ambient temperature, wherein at least one reactant for preparing said propellant is an oxidizer in a liquid or gaseous phase at standard temperature, and at least one reactant for preparing said propellant is in a solid phase structure, open pore plastic foam fuel, having hollow spaces which are connected to each other, arranged at an inner isolation of the combustion chamber or completely filling the latter, the solid phase structure, open pore plastic foam fuel, having hollow spaces completely containing the liquid or gaseous oxidizer reactant cryogenically transformed and stabilized as a cryogenic solid.

14. The stabilized cryogenic solid monergole propellant defined in claim 13 wherein the at least one reactant for preparing said monergole propellant in a liquid or gaseous phase at standard temperature is an emulsion of liquid components not soluble in one another.

15. The stabilized cryogenic solid monergole propellant defined in claim 13 wherein the at least one reactant for preparing said propellant in a liquid or gaseous phase at standard temperature is a suspension of solid components in liquid components.

16. The stabilized cryogenic solid monergole propellant defined in claim 13 wherein the at least one reactant for preparing said monergole propellant in a liquid or gaseous phase at standard temperature is a liquid impregnated packing.

17. The stabilized cryogenic solid monergole propellant defined in claim 13 wherein the open pore plastic foam fuel is a polyethylene foam, a polyurethane foam, a HTBP foam, or a GAP foam.

18. The stabilized cryogenic solid monergole propellant defined in claim 13 wherein the solid phase cryogenically transformed from the liquid or gaseous phase is comprised of a stable solid.

19. The stabilized cryogenic solid monergole propellant defined in claim 18 wherein the solid phase cryogenically transformed from the liquid or gaseous phase as a stable solid is transformed oxygen, hydrocarbons, hydrogen peroxide, or an HEDM propellant.

20. The stabilized cryogenic solid monergole propellant defined in claim 13 wherein the solid phase structure, open pore plastic foam fuel, having hollow spaces is comprised of a packing of optionally shaped individual pieces whose hollow spaces are connected together in which a frozen liquid oxidizer is contained as a reactant.

21. The stabilized cryogenic solid monergole propellant defined in claim 20 wherein the frozen liquid reactant is not in homogeneous form but itself is a packing which is mixed into the hollow space of the first packing.

22. The stabilized cryogenic solid monergole propellant defined in claim 13 wherein the solid phase structure, open pore plastic foam fuel, having hollow spaces is provided with a protective coating which chemically insulates the solid phase structure, open pore plastic foam fuel, from the reactant in the liquid or gaseous phase.

* * * * *